United States Patent Office 3,419,494
Patented Dec. 31, 1968

3,419,494
OIL-IN-WATER EMULSION AND METHOD
OF MAKING SAME
Ford C. Teeter, Palos Heights, Ill., and Delbert Lee, Hammond, Ind., assignors to Sinclair Research, Inc., New York, N.Y., a corporation of Delaware
No Drawing. Continuation-in-part of application Ser. No. 380,946, July 7, 1964. This application Mar. 6, 1967, Ser. No. 620,636
15 Claims. (Cl. 252—34.7)

ABSTRACT OF THE DISCLOSURE

A water-dispersible, pre-emulsified fluid composition is made from about 30 to 60 weight percent of an oil having a viscosity at least about that of kerosene, about 1 to 7 weight percent of an alkanol amide (e.g., diethanol amide of oleic acid), about 1 to 8 weight percent of a fatty acid salt (e.g., ammonium oleate), about 35 to 60 weight percent of water and viscosity-reducing amounts of a mineral acid, mineral acid salt, lower fatty acid or lower fatty acid salt, e.g. acetic acid, the ratio of the oil to the amide being about 5 to 20:1 and the total amount of the amide plus the fatty acid salt employed being about 3 to 15 weight percent. The fluid composition can be made by blending with about 10 to 50 percent of the total amount of the oil and about 0.25 to 10 weight percent, based on the composition, of the fatty acid, adding an aqueous solution of base (e.g., ammonium hydroxide) followed by the addition of the balance of the oil, the water in increments and the viscosity reducer.

This application is a continuation-in-part of abandoned application Ser. No. 380,946, filed July 7, 1964.

This invention relates to a stable oil-in-water emulsion. More specifically, the invention relates to a stable pre-emulsified oil for use, for instance, in the manufacture of fiberglass and to a method of preparing this oil.

In manufacturing fiberglass, it is customary to use a high viscosity oil in the form of an emulsion as a lubricant during the blowing and elongation of the glass fibers. The emulsion is also used as a medium for applying binders and resins to the fiberglass. Such emulsions are often prepared in the manufacturing plant from bulk mineral oil, emulsifiers and ammonium hydroxide. Various amounts of binders and resins may be added to the emulsions depending on the type of fiberglass being manufactured. Emulsion mixtures of this type are often more like slurries than stable emulsions and thereby lack stability and uniformity.

The object of this invention is to provide a pre-emulsified oil for use in making fiberglass, which oil is relatively stable and uniform. The product of the present invention when diluted with water produces oil-in-water emulsions of good stability even after the addition of binders and resins. Moreover, this product is outstanding as a spray oil for making very fine fiberglass such as the white wools used in insulating appliances.

Fiberglass spray oil is used several ways in a fiberglass manufacturing plant. One common use is in making fiberglass for commercial insulation batts. Molten rivulets of glass flow from small openings in the bottom of a long metal trough and are steam blown into elongated, fine glass fibers. To aid in obtaining maximum elongation of the fibers, a dilute emulsion of fiberglass spray oil with binders and resins is fed through openings in a large rectangular ring around the rivulets of molten glass and the emulsion is drawn by venturi action into the steam.

At this stage the oil in the emulsion acts as a lubricant for the fibers and allows them to slip and slide over each other without breaking. The glass fibers are blown by the steam to form a veil which is woven back and forth on an endless belt to produce a thick layer of fiberglass. The fiberglass layer on the endless belt is compressed to the desired thickness by rolls and led into a furnace where the binder, e.g., phenol-formaldehyde resin, is thermoset. As the formed layer of fiberglass leaves the furnace, it is cut into proper sizes for insulation batts. The thermoset resin holds the fiberglass in form and the slight amount of residual mineral oil remaining on the fibers minimizes dust in handling or can aid in dust retention if the batts are used in air filters. The oil cannot be readily re-emulsified since the ammonium emulsifier is destroyed in the oven.

For specialized uses such as pipe insulation and for making glass wool for insulating appliances, a fine fiberglass is required. These fine strands are made by blowing smaller glass rivulets to even greater elongation. Normally only a dilute emulsion of the fiberglass spray oil without binders and resins is used in making the finer fiberglasses. The glass wool veil is not run through the oven but is collected and subsequently used for various fabrications.

Binders, if required, can be dissolved in a dilute emulsion of the fiberglass spray oil and the oil can be sprayed onto the white wool after it has been shaped around various forms. For certain types of appliances such as stoves or refrigerators, the glass wool may be pre-formed and the resin thermoset by heating or it may be applied and thermoset when the appliance is used. For some appliances, no binders are used for the white wool and it is merely placed in the appliance. For the pre-formed pipe insulation, a fiberglass with fibers of intermediate size are used. The fiberglass is placed around an internal mandrel over which is fitted a hinged larger outer form. The fiberglass is heated to thermoset the resin, the outer form is removed and the formed insulation is cut down one side to remove it from the mandrel. This type of pipe insulation can be applied by merely opening and snapping onto pipes and no other fasteners are required. Even though it is initially more costly than other types of insulation, this cost is nullified by the ease of application and its savings in labor.

At present various combinations of oil, emulsifier and resin are used in the formation of spray oils. A typical spray oil includes a 200 SUS at 210° F. mineral lubricating oil, phenol-formaldehyde resin, pine wood-derived thermoplastic resin and ammonium hydroxide. Such spray oils, however, are only slurries and require constant agitation to maintain a degree of emulsification.

This invention is based on the discovery that an improved pre-emulsified fiberglass spray oil consisting essentially of water, a normally liquid oil having a viscosity at least that of kerosene, an alkanol amide of a fatty acid and the ammonium or alkali metal salt of a fatty acid, is superior in emulsion stability, low temperature fluidity and low foamability.

The normally liquid oil used in forming the emulsion of this invention should have a viscosity of at least about that of kerosene. Also, when the emulsions of the invention are employed in glass manufacturing operations, for instance, the oil component should have a flash point which is sufficiently high to avoid undue vaporization of the oil at the temperatures employed in the glass manufacturing operation. The preferred oil is a lubricating oil such as mineral oil and synthetic ester lubricants, having a viscosity of about 130–180 SUS at 210° F. The lubricating oil may consist partially or entirely of synthetic oils. Exemplary of suitable synthetic oils are alkylene polymers; oils derived from coal; propylene oxide polymers, their ethers and esters in which the terminal hydroxyl groups have been modified, dicarboxylic acid diesters such as di-butyl adipate, di-2-ethylhexyl sebacate, di-n-hexyl fumeric polymer and di-lauryl azelate; and alkyl benzenes. The oil concentration may vary from about 30 to 60%, while the preferred oil concentration is normally about 40 to 50 weight percent based on the emulsion. However, the preferred amount may vary with the specific use intended for the spray oil.

The emulsifier system used to maintain the spray oil in a dispersed state comprises an ammonium or alkali metal fatty acid salt and an alkanol amide of a fatty acid. The alkanol amide of a fatty acid can be represented by the following formula:

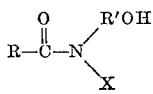

wherein R is an aliphatic hydrocarbon radical, preferably olefinically unsaturated, of about 12 to 20 carbon atoms and R' is an aliphatic hydrocarbon radical of about 2 to 5 carbon atoms and X is R'OH, H or lower alkyl. The fatty acid residue of the alkanol amide may be derived from fatty acids such as lauric, stearic, palmitic, oleic, linoleic and eleostearic. The preferred alkanol amide is derived from an amine wherein X is R'OH, i.e., a dialkanol amine, and the dialkanol amine may have the same or different alkanol groups. Suitable alkanol amides include those derived from diethanol amine, dibutanol amine, ethyl-ethanol amine, octyl-ethanol amine, ethanol amine, ethyl-butanol amine, ethyl-propanol amine, hexyl-propanol amine, propanol amine, pentanol amine, ethyl-pentanol amine and octyl-pentanol amine. The amount of alkanol amide employed is from 1 to 7, preferably about 3 to 7, weight percent based on the emulsion, with the ratio of oil to alkanol amide being about 5 to 20:1 preferably about 7 to 15:1. The amide may contain some unreacted fatty acid which may become a fatty acid salt in the formation of the emulsion.

The second component of the emulsifier system, a fatty acid salt, is obtained from fatty acids containing from about 12 to 20 carbon atoms. Those fatty acids used for the dialkanol amide component of the emulsifier systems may also be used for the fatty acid salt. The preferred salt is an ammonium salt; however, salts of alkali metals such as sodium and potassium are suitable. The fatty acid salt not only serves as an emulsifier but also functions to unbalance the emulsifiers when they are heated and thus prevents re-emulsification of the oil after it is in place in the formed fiberglass. The fatty acid salt is usually formed in situ by adding fatty acid and an alkali metal hydroxide or an ammonium salt forming compound during formulation of the spray oil.

The term "ammonium" as used in this disclosure refers to radicals derived from ammonia and hydrocarbon substituted ammonia, i.e., amines. Both polyamines and monoamines may be employed. The amine may be primary, secondary or tertiary and may contain both aromatic and aliphatic groups which may contain non-deleterious substituents. Preferably the hydrocarbon groups are essentially free of ethylenic and acetylenic unsaturation, that is, all of the carbon-to-carbon linkages are not less than 1.40 A., the interatomic distance of carbon atoms in a benzene ring. The amines may contain from about 1 to 20 carbon atoms with the water soluble amines being preferred. Suitable amines include phenyl amine, phenylethyl amine, p-octyl phenyl amine, ethyl amine, diethyl amine, diisobutyl amine, dioctyl amine, hexyl amine, trimethyl amine, triethyl amine, ethylenediamine, diethylenetriamine, piperazine, morpholine, etc. The ammonium salt forming compound may be added as anhydrous ammonia, a water solution of ammonium hydroxide, anhydrous amine or a water solution of amine.

The amount of fatty acid salt used may vary from about 1 to 8 weight percent, preferably from about 3 to 6%, of the emulsion. Enough ammonium hydroxide or alkali metal hydroxide is added as a water solution to react with the fatty acid to form the salt. The ratio of dialkanol amide to fatty acid may often vary from about 0.5:1 to 2:1 with the preferred ratio being about 1:1.

The total amount of the alkanol amide plus the fatty acid salt employed in the composition of the invention is about 3 to 15, preferably about 5 to 13 weight percent. The use of greater amounts, especially with oils of relatively high viscosity may result in undesirable compositions which gel or thicken.

The amount of water used in the spray oil may vary over a wide range. For normal use a preferred range is from about 35 to 47 weight percent water. However, less viscous spray oils containing as much as 60% water may be used for some applications.

If desired, binders or glues may be incorporated into the spray oil. The binder is normally a thermosetting resin such as phenol-formaldehyde. However, it is generally possible to incorporate a wide variety of glues and binders into the spray oil of this invention and its use is not limited to any particular resin.

The spray oil advantageously may have a viscosity in the range of about 200 to 1200 centipoises at 77° F. by Brookfield Viscosimeter. This viscosity range assures that the spray oil will be fluid at temperatures as low as 40° F. so that it may be easily removed from a normal shipping drum. The spray oil is also a very stable emulsion, e.g. after 24 hours no more than a slight cuff, e.g. a maximum of 5 mm. cream cuff and preferably no cuff, should result in 10% distilled water.

In use, the spray oil is mixed with water to form a stable oil-in-water emulsion which can be used as a lubricant in fiberglass manufacture. The ratio of spray oil to added water frequently varies from about 1:3 to 1:100 with a range of about 1:5 to 1:10 being preferred.

The spray oil can be prepared according to the following procedure. The first step may be to blend from about 10 to 50% of the oil to be used with the alkanol amide and about 0.25 to 10 percent, based on the weight of the final emulsion, of the fatty acid until a uniform mixture is obtained. Alkali metal hydroxide or ammonium hydroxide in aqueous solution is then added slowly in an amount sufficient to form the corresponding salt of the fatty acid while maintaining the temperature within the range of about 70 to 150° F., and preferably about 90 to 100° F. Formation of the fatty acid salt in the oil assures the production of the desired oil-in-water emulsion. The mixture is then stirred to mix well and the balance of the oil is added. The mixture is again stirred and water is added in small increments, say for instance of up to about 4% of the total amount of water to be added and preferably about 0.5 to 2% of the total water added leaving enough time between each addition for the water to be taken up by the mixture. This slow addition should be continued until at least about 75% of the total amount is added.

The foregoing procedure is designed to yield a stable emulsion having the desired viscosity, however, emulsions having a much higher viscosity than that desired may occasionally result when carrying out the process as outlined. If a viscosity outside the desired range is obtained, the viscosity can be lowered by the addition of a mineral acid or lower fatty acid or salts thereof. A salt may be formed from excess base when the acid is added and the salt is an effective viscosity reducer. Suitable salts are the mineral acid and lower fatty acid salts of ammonium and alkali metals. Examples of suitable viscosity reducing additives are acetic acid, hydrochloric acid, ammonium acetate, ammonium sulfate, ammonium chloride, sulfuric acid, sodium chloride, sodium acetate and potassium sulfate. It is advisable to add these materials very slowly in order that the viscosity of the oil is not unduly lowered. If too much additive is used water may separate from the finished product. Up to about 5% of the viscosity reducer may often be used with the preferred amount being from about 0.0005 to about 2%.

EXAMPLE I

A spray oil was prepared using the procedure outlined above. Sixteen-hundred pounds of a mineral oil having a viscosity of 151 SUS at 210° F. and 2516 SUS at 100° F. were blended with 550 pounds of oleic acid diethanol amide and 500 pounds of oleic acid at 70° F. The properties of the components are given in Table I.

TABLE I.—TYPICAL TESTS ON COMPONENTS USED IN EXAMPLES I–III

| Tests | Lube oil | Oleic acid | Diethanol amide of oleic acid |
|---|---|---|---|
| Gravity, ° API | 27.1 | 26.0 | 10.9 |
| Flash, ° F | 545 | 385 | |
| Fire, ° F | 630 | 425 | |
| Viscosity, SUS at 100° F | 2516 | 668 | 2157 |
| Viscosity, SUS at 210° F | 151 | | 115.8 |
| Pour, ° F | 0 | +35 | +15 |
| Color, ASTM | 16.0 | | |
| Acid number | .05 | 193.9 | 16.75 |
| Saponification number | | 195 | 88.2 |
| Iodine value | | 90.5 | |

The mixture was stirred until it was uniform. To the mixture 238 pounds of a 28% solution of ammonium hydroxide was then slowly added while the temperature was maintained below 95° F. The mixture was stirred for 30 minutes and then the remainder of the oil, 2500 pounds, was added with stirring which continued for 30 minutes. Water was then added in 100 pound increments until 4612 pounds had been added. The first and last portions of water were taken up rather rapidly while the middle 30% was taken up very slowly. During the addition of the water the mixture was initially a soft paste but became quite thick after the addition of about ⅓ of the water. The mixture became smooth and could be poured after all the water had been added. In order to prevent foaming during the addition of the water, the mixture was slowly stirred. After the water was added the viscosity was measured and found to be 283 centipoises at 77° F. The analysis of the product is shown in Table II.

TABLE II

| Composition, wt. percent | Example I | Example II | Example III |
|---|---|---|---|
| Oleic acid | 5.00 | 5.00 | 5.00 |
| Diethanol amide of oleic acid | 5.50 | 7.00 | 6.00 |
| Oil-bright stock, 150 SUS at 210° F., 95 V.I. | 41.00 | 38.00 | 40.76 |
| Ammonium hydroxide (28%) | 2.38 | 4.00 | 2.24 |
| Water | 46.12 | 46.00 | 46.00 |
| Tests: | | | |
| Specific gravity, 60/60° F | .9047 | .9563 | .9517 |
| Water, percent (by dist.) | 47.7 | 52.0 | 48.0 |
| Total solids, percent | 50.5 | 48.0 | 50.3 |
| Sulfated ash, percent | .009 | .008 | .022 |
| Nitrogen, percent | .42 | .70 | .62 |
| Basic nitrogen, percent | .37 | | |
| Viscosity, centipoises at 77° F. (Brookfield) | 283 | 349 | 370 |
| Emulsion stability, after 24 hours: | | | |
| 10% in distilled water | (¹) | (³) | (³) |
| 10% in water with 400 p.p.m. hardness | (²) | (³) | (³) |
| Appearance | Good | Good | Good |

¹ 5 mm. cuff.
² 3 mm. cuff.
³ Slight cuff.

EXAMPLES II AND III

The procedure of Example I was repeated. The percentages of the components used and the resulting product analysis are shown in Table II.

Although the method of Examples I–III normally produces a product of the desired viscosity, products have been obtained with viscosities varying from 353 to 39,200 centipoises at 77° F. Acetic acid was added as a 28% solution to these high viscosity emulsions in order to lower the viscosity. The results are shown in Table III. It can be seen that the addition of acetic acid is extremely effective in adjusting the emulsion viscosity to the desired range. Good viscosity adjustments are also obtained using ammonium acetate, ammonium sulfate, ammonium chloride and sodium acetate.

TABLE III.—EFFECT OF ACETIC ACID ON THE VISCOSITY OF SPRAY OIL

| Percent glacial acetic acid (100% basis) | Viscosity in centipoises at 77° F. (Brookfield) Batch | | | | | | |
|---|---|---|---|---|---|---|---|
| | A | B | C | D | E | F | G |
| 0 | 353 | 435 | 710 | 950 | 4,820 | 7,260 | 39,200 |
| .0005 | 325 | 415 | | | | | |
| .001 | 333 | 404 | | 944 | | | |
| .005 | 320 | 360 | 398 | 782 | | | |
| .01 | 296 | 355 | 300 | 460 | | | 19,200 |
| .02 | (*) | (*) | (*) | 418 | | | 3,740 |
| .03 | | | | (*) | | | |
| .04 | | | | | | | 420 |
| .05 | | | | | 251 | 750 | |
| .065 | | | | | | 500 | |
| .08 | | | | | (*) | 386 | |
| .2 | | | | | | (*) | (*) |

* Concentration at which water separates from the product.

It is claimed:

1. A water-dispersible oil-in-water emulsion consisting essentially of about 1 to 7 weight percent of an alkanol amide having the formula

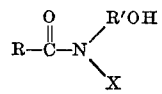

wherein R is an aliphatic hydrocarbon radical of about 12 to 20 carbon atoms, R' is an aliphatic hydrocarbon radical of about 2 to 5 carbon atoms and X is selected from the group consisting of R'OH, hydrogen and lower alkyl, about 1 to 8 weight percent of a fatty acid salt containing about 12 to 20 carbon atoms and selected from the group consisting of ammonium fatty acid salts and alkali metal fatty acid salts, about 30 to 60 weight percent of an oil having a viscosity at least about that of kerosene, about 35 to 60 weight percent water and, in amounts sufficient to reduce the viscosity of the emulsion, a viscosity reducer selected from the group consisting of mineral acids, mineral acid salts, lower fatty acids and lower fatty acid salts; the ratio of said oil to said amide being about 5 to 20:1, and the total amount of said amide plus said fatty acid salt being about 3 to 15 weight percent.

2. The oil-in-water emulsion of claim 1 wherein R and the fatty acid used to prepare said salt are olefinically unsaturated, X is R'OH and the oil has a viscosity of about 130 to 180 SUS at 210° F.

3. The oil-in-water emulsion of claim 2 containing about 3 to 7 weight percent dialkanol amide, about 3 to 6 weight percent fatty acid salt, about 40 to 50 weight percent oil and about 40 to 45 weight percent water.

4. The oil-in-water emulsion of claim 3 wherein the dialkanol amide is the diethanol amide of oleic acid and the fatty acid salt is ammonium oleate.

5. The oil-in-water emulsion of claim 2 containing about 3 to 7 weight percent dialkanol amide, about 3 to 6 weight percent fatty acid salt, about 40 to 50 weight percent oil and about 35 to 47 weight percent water.

6. The oil-in-water emulsion of claim 5 wherein the viscosity reducer is acetic acid.

7. A process for the production of a water-dispersible oil-in-water emulsion consisting essentially of about 1 to 7 weight percent of an alkanol amide having the formula

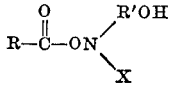

wherein R is an aliphatic hydrocarbon of about 12 to 20 carbon atoms, R' is an aliphatic hydrocarbon radical of about 2 to 5 carbon atoms and X is selected from the group consisting of R'OH, hydrogen and lower alkyl, about 1 to 8 weight percent of a fatty acid salt containing about 12 to 20 carbon atoms selected from the group consisting of ammonium fatty acid salts and alkali metal fatty acid salts (about 30 to 60 weight percent of an oil having a viscosity at least that of kerosene about 35 to 60 weight percent water and, in amounts sufficient to reduce the viscosity of the emulsion, a viscosity reducer selected from the group consisting of mineral acids, mineral acid salts, lower fatty acids and lower fatty acid salts; the ratio of said oil to said amide being about 5 to 20:1 and the total amount of said amide plus said fatty acid salt being about 3 to 15 weight percent, said process consisting essentially of blending said alkanol amide with about 10 to 50 percent of the total amount of said oil and about 0.25 to 10 weight percent based on the weight of said emulsion of a fatty acid of from 12 to 20 carbon atoms to form a uniform mixture, adding a water solution of a base selected from the group consisting of ammonium hydroxide and alkali metal hydroxides to form the corresponding salt of said fatty acid while maintaining the temperature in the range from about 70 to 150° F., mixing the resulting composition, adding the balance of said oil, adding water in increments of up to about 4 weight percent of the total amount of water to be added until at least about 75% of the water has been added and then adding the balance of said water to form a stable emulsion, and adding the viscosity reducer to said emulsion.

8. The process of claim 7 wherein the viscosity reducer is acetic acid.

9. The process of claim 8 wherein said base addition is at a temperature range of about 90 to 100° F.

10. The process of claim 9 wherein the water is added in increments of about 0.5 to 2%.

11. The process of claim 9 wherein said alkanol amide is the diethanol amide of oleic acid and said fatty acid salt is ammonium oleate.

12. The process of claim 8 wherein said alkanol amide is the diethanol amide of oleic acid and said fatty acid salt is ammonium oleate.

13. The process of claim 8 wherein about 0.0005 to 2% of the acetic acid is added.

14. The process of claim 7 wherein the base is ammonium hydroxide.

15. The process of claim 7 wherein about 0.0005 to 2% of the viscosity reducer is added.

References Cited

UNITED STATES PATENTS

| | | | |
|---|---|---|---|
| 867,141 | 9/1907 | Kosters | 252—49.5 X |
| 2,107,284 | 2/1938 | Bone et al. | 252—49.5 X |
| 2,967,831 | 1/1961 | Hommer | 252—49.5 X |
| 3,071,544 | 1/1963 | Rue | 252—49.5 X |
| 3,082,168 | 3/1963 | Rue et al. | 252—49.5 X |

OTHER REFERENCES

Kirk-Othmer "Encyclopedia of Chemical Technology," vol. 5 (1950) pp. 709–711.

DANIEL E. WYMAN, *Primary Examiner.*

W. H. CANNON, *Assistant Examiner.*

U.S. Cl. X.R.

252—42.1, 49.5, 312

UNITED STATES PATENT OFFICE
CERTIFICATE OF CORRECTION

Patent No. 3,419,494  
December 31, 1968

Ford C. Teeter et al.

It is certified that error appears in the above identified patent and that said Letters Patent are hereby corrected as shown below:

Column 6, line 47, beginning with "3. The oil-in-water" cancel all to and including "percent water." in line 50, same column 6 and insert instead:
3. The oil-in-water emulsion of claim 4 wherein the viscosity reducer is present in amounts of about 0.0005 to 2%. --;
same column 6, line 51, the claim reference numeral "3" should read -- 5 --;
line 58, the claim reference numeral "5" should read -- 3 --.

Signed and sealed this 24th day of March 1970.

(SEAL)  
Attest:

Edward M. Fletcher, Jr.  
Attesting Officer

WILLIAM E. SCHUYLER, JR.  
Commissioner of Patents